US012654805B2

(12) United States Patent
Naude et al.

(10) Patent No.: US 12,654,805 B2
(45) Date of Patent: Jun. 16, 2026

(54) CONTINUOUSLY VARIABLE TRANSMISSION DRIVE SYSTEM

(71) Applicant: Toka Technologies Limited, One Tree Point (NZ)

(72) Inventors: Johannes Jacobus Naude, Randburg (ZA); Bruce James Thompson, Western Cape (ZA)

(73) Assignee: Toka Technologies Limited, One Tree Point (NZ)

( * ) Notice: Subject to any disclaimer, the term of this patent is extended or adjusted under 35 U.S.C. 154(b) by 371 days.

(21) Appl. No.: 18/573,207

(22) PCT Filed: Jun. 27, 2022

(86) PCT No.: PCT/IB2022/055940
§ 371 (c)(1),
(2) Date: Dec. 21, 2023

(87) PCT Pub. No.: WO2023/275706
PCT Pub. Date: Jan. 5, 2023

(65) Prior Publication Data
US 2024/0294230 A1      Sep. 5, 2024

(30) Foreign Application Priority Data

Jun. 28, 2021    (ZA) ................................. 2021/04432

(51) Int. Cl.
*F16H 15/08*       (2006.01)
*B62M 6/55*        (2010.01)
(Continued)

(52) U.S. Cl.
CPC .............. *B62M 11/12* (2013.01); *B62M 6/55* (2013.01); *B62M 11/10* (2013.01); *F16H 15/10* (2013.01); *F16H 15/12* (2013.01)

(58) Field of Classification Search
CPC ........ B62M 6/55; B62M 11/10; B62M 11/12; F16H 15/08; F16H 15/10; F16H 15/12
See application file for complete search history.

(56) References Cited

U.S. PATENT DOCUMENTS 5,342,075 A * 8/1994 Williams ............... B62M 17/00
280/238
5,622,081 A * 4/1997 Clements ............... B62M 25/02
280/238

(Continued)

FOREIGN PATENT DOCUMENTS

CN       107143627 A *  9/2017  ............. F16H 61/32
FR         2738210 A1 *  3/1997  ............. B62M 17/00
WO    2019/123162 A1     6/2019

OTHER PUBLICATIONS

International Search Report and Written Opinion received for PCT Patent Application No. PCT/IB2022/055940, mailed on Oct. 28, 2022, 10 pages.

*Primary Examiner* — Erick R Solis
(74) *Attorney, Agent, or Firm* — ArentFox Schiff LLP

(57) ABSTRACT

The invention provides a continuously variable transmission drive system (1) comprising a central friction drive disk (27); two rollers (159; 203) clamped against two opposite sides (30) of the drive disk (27) with their outer rims (169; 205) in friction-drive contact with drive disk (27) and being movable across the disk radius to alter the gear ratio; an input drive shaft (15) connected to the rollers (159; 203) for driving the rollers (159; 203); and a hinged clamping assembly (21; 23) which is associated with the drive shaft (15) and configured for forcibly clamping the two rollers (159; 203) around the drive disk (27) with a variable clamping force that is proportional to the input torque on drive shaft (15).

21 Claims, 13 Drawing Sheets

(51) Int. Cl.
    *B62M 11/10*       (2006.01)
    *B62M 11/12*       (2006.01)
    *F16H 15/10*       (2006.01)
    *F16H 15/12*       (2006.01)

(56)               References Cited

U.S. PATENT DOCUMENTS

| | | | |
|---|---|---|---|
| 7,434,489 B1 * | 10/2008 | Scranton | B62M 17/00 |
| | | | 280/238 |
| 2019/0128390 A1 * | 5/2019 | Williams | F16H 29/16 |
| 2019/0300116 A1 * | 10/2019 | Smith | F16H 55/10 |
| 2020/0331559 A1 | 10/2020 | Smith et al. | |
| 2023/0051165 A1 * | 2/2023 | Lieh | B62M 1/36 |

* cited by examiner

DETAIL B
SCALE 1.25 : 1

SECTION A-A

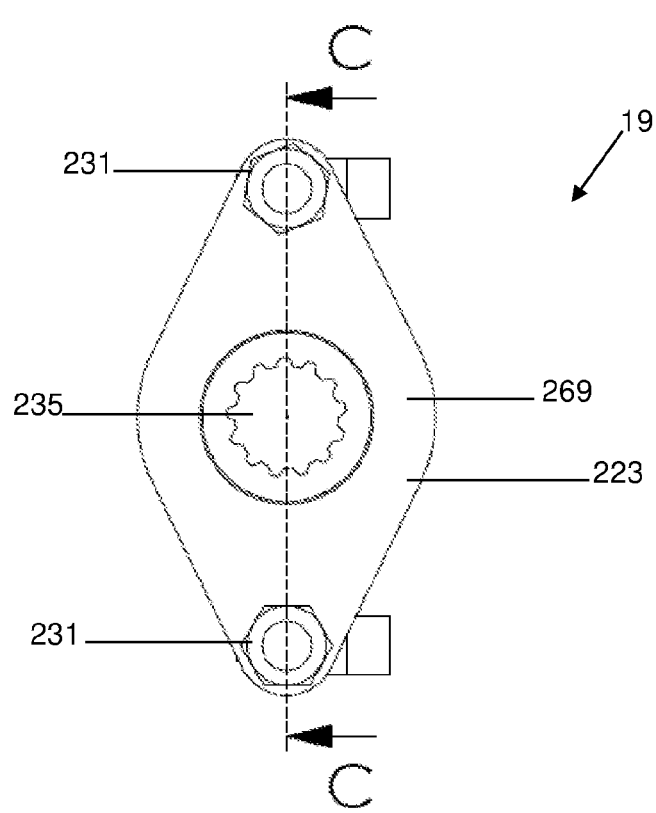
FIGURE 6C
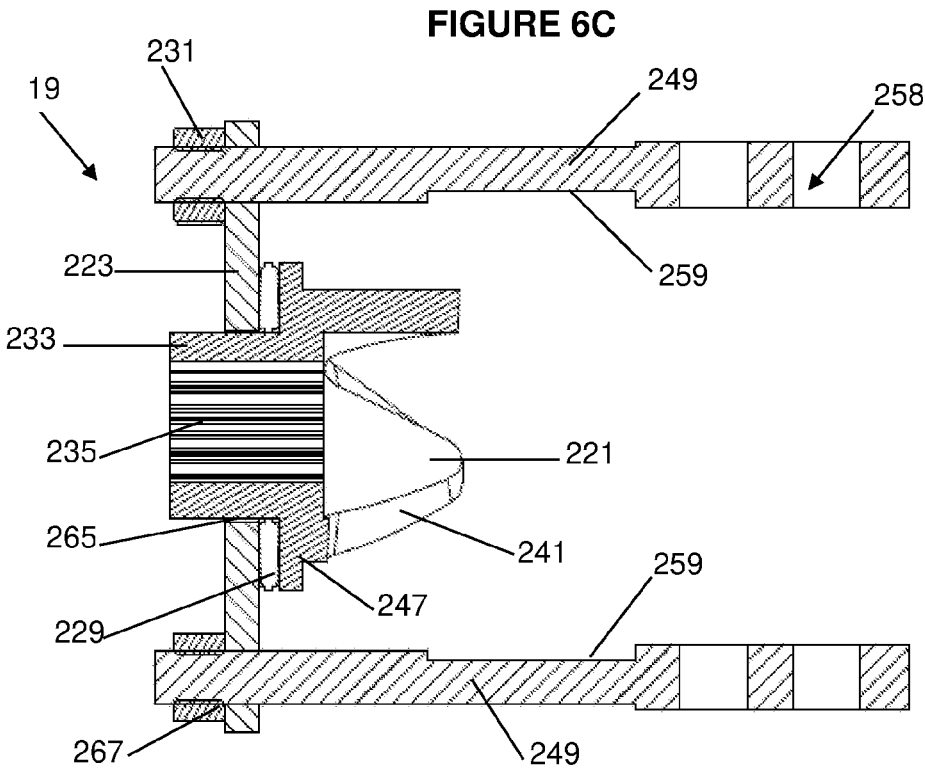
SECTION c-c     FIGURE 6D

SECTION c-c

CONTINUOUSLY VARIABLE TRANSMISSION DRIVE SYSTEM

CROSS-REFERENCE TO RELATED APPLICATIONS

This application is U.S. National Stage entry under 35 U.S.C. § 371 based on International Application PCT/IB2022/055940, filed on Jun. 27, 2022, which claims the benefit of priority to ZA Patent Application No. 2021/04432, filed Jun. 28, 2021, which are incorporated herein by reference in their entireties.

FIELD OF THE INVENTION

The invention provides a continuously variable transmission (CVT) drive system for providing automatic continuously variable transmission for driving wheels. It is envisaged that the system will find application, inter alia, as a bicycle drive train; as transmission in scooters, motorcycles, 3-wheelers, ATV's (all-terrain vehicles); a transmission for integration into home appliances, such as washing machines; and for ratio/speed control of compressors. However, other applications are not excluded.

BACKGROUND TO THE INVENTION

Currently, bicycles employ a number of drive train systems, which include the well-known derailleur system used in most bicycles. With the introduction of electric bicycles (e-bikes), requirements for bicycle drive trains have changed since human power, via the pedals, now need to be combined with power from an electric motor. Typical features that have become possible with the introduction of an electric motor include regenerative braking and power assist when a rider requires it. Derailleur systems cannot accommodate regenerative braking. Other transmission systems, like the Pinion gearbox and Rohloff hub gearbox, do provide multi-ratio transmission solutions (i.e., up to 14 speeds) that are capable of regenerative braking. However, these two transmission systems still require a drive belt or chain between a crank and a hub which is typically not enclosed, is exposed to the environment, and requires maintenance. Maintenance on the derailleur systems is an even bigger issue. Ideally, an infinite number of ratios, typically provided by a CVT transmission, will provide the ideal solution. One such prior art CVT system, called the Nuvinci CVT transmission, has been in production as a hub transmission, but it suffers from a relative high weight, low mechanical efficiency, torque limitations, and a limited ratio range. It also suffers from the fact that it cannot handle maximum input torque in all ratios. The current invention aims to solve the above issues to provide the ideal transmission for bicycles and e-bikes.

BRIEF DESCRIPTION OF THE DRAWINGS

Embodiments, where the continuously variable transmission (CVT) drive system of the invention is applied to a bicycle drive train, is now described by way of examples only and with reference to the accompanying drawings in which:

FIGS. 6C-6D illustrate a side view and a sectional view of the loading cam unit;

DETAILED DESCRIPTION OF THE PREFERRED EMBODIMENTS

Figure 1A:
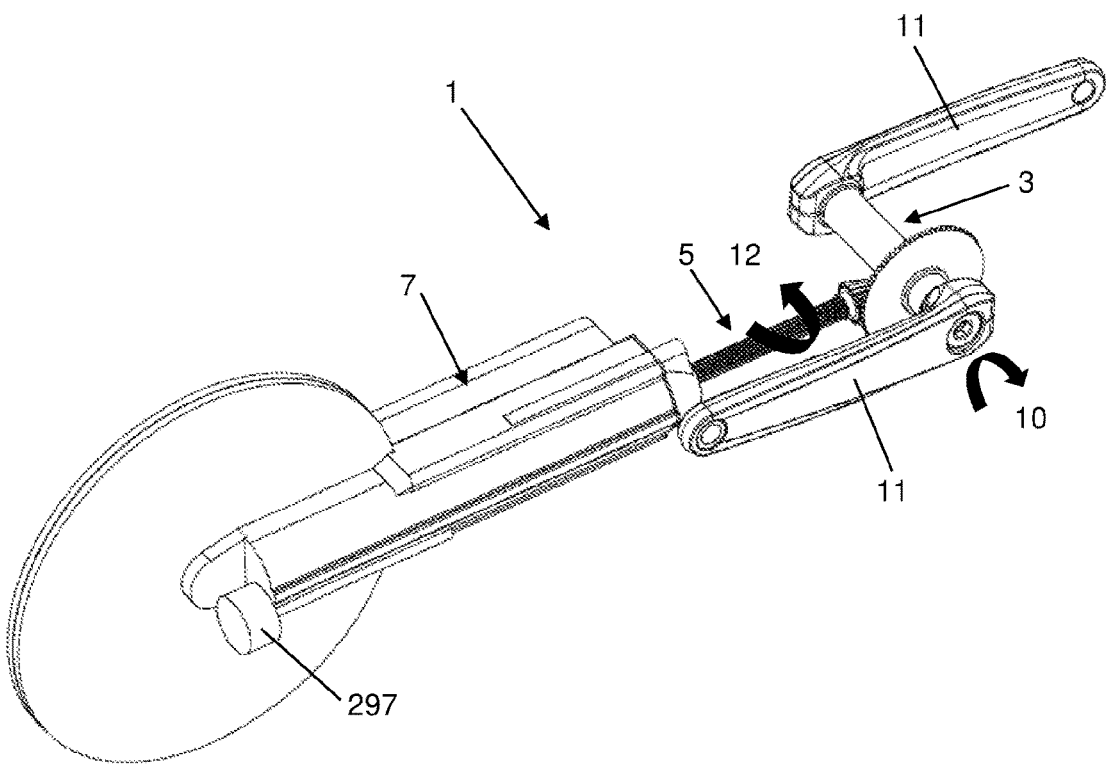
FIGS. 1A-1B are two perspective views, at opposite angles of rotation, of a bicycle drive train according to the invention.
Figure 1B:
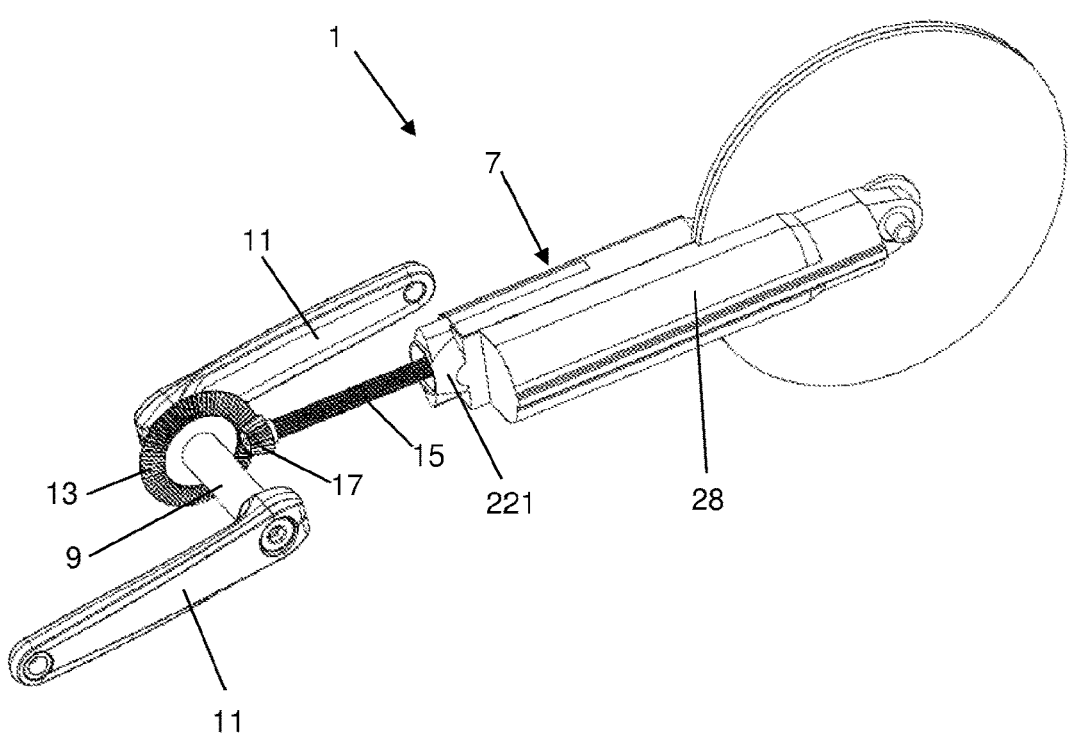

A continuously variable transmission (CVT) drive system according to the invention is designated by reference numeral [1], as illustrated in FIG. 1. It includes a crank unit [3], an intermediate shaft unit [5], and a CVT unit [7].

The crank unit [3] includes a crank shaft [9] which is attached at its opposite ends to two oppositely-facing bicycle pedal arms [11] which are connected to the crank shaft [9] such that the ends of the pedal arms [11] are orientated 180° away from each other. A bevel gear [13] is attached to the crank shaft [9] intermediate the two pedal arms [11]. The crank shaft [9] is rotatably supported within a bicycle frame (not shown) adjacent each pedal arm [11], as is common in bicycle design.

The intermediate shaft unit [5] extends between and connects the crank unit [3] and the CVT unit [7] and includes a splined drive shaft [15] with terminates at its one end in a bevel gear pinion [17]. The pinion [17] engages and meshes with the bevel gear [13] of the crank unit [3]. The splined drive shaft [15] and pinion [17] are rotatably supported via bearings (not shown) in the bicycle frame (not shown).

CVT Unit [7]—FIG. 2

The CVT unit [7] is illustrated in FIG. 2 and comprises a loading cam unit [19], a top clamp unit [21], a bottom clamp unit [23], a top roller unit [155], a bottom roller unit [157], a disk unit [25], and a casing unit [28]. The casing unit [28] is hidden in FIG. 2, but present in FIG. 1.

Figures 2A, 2B, 2C:
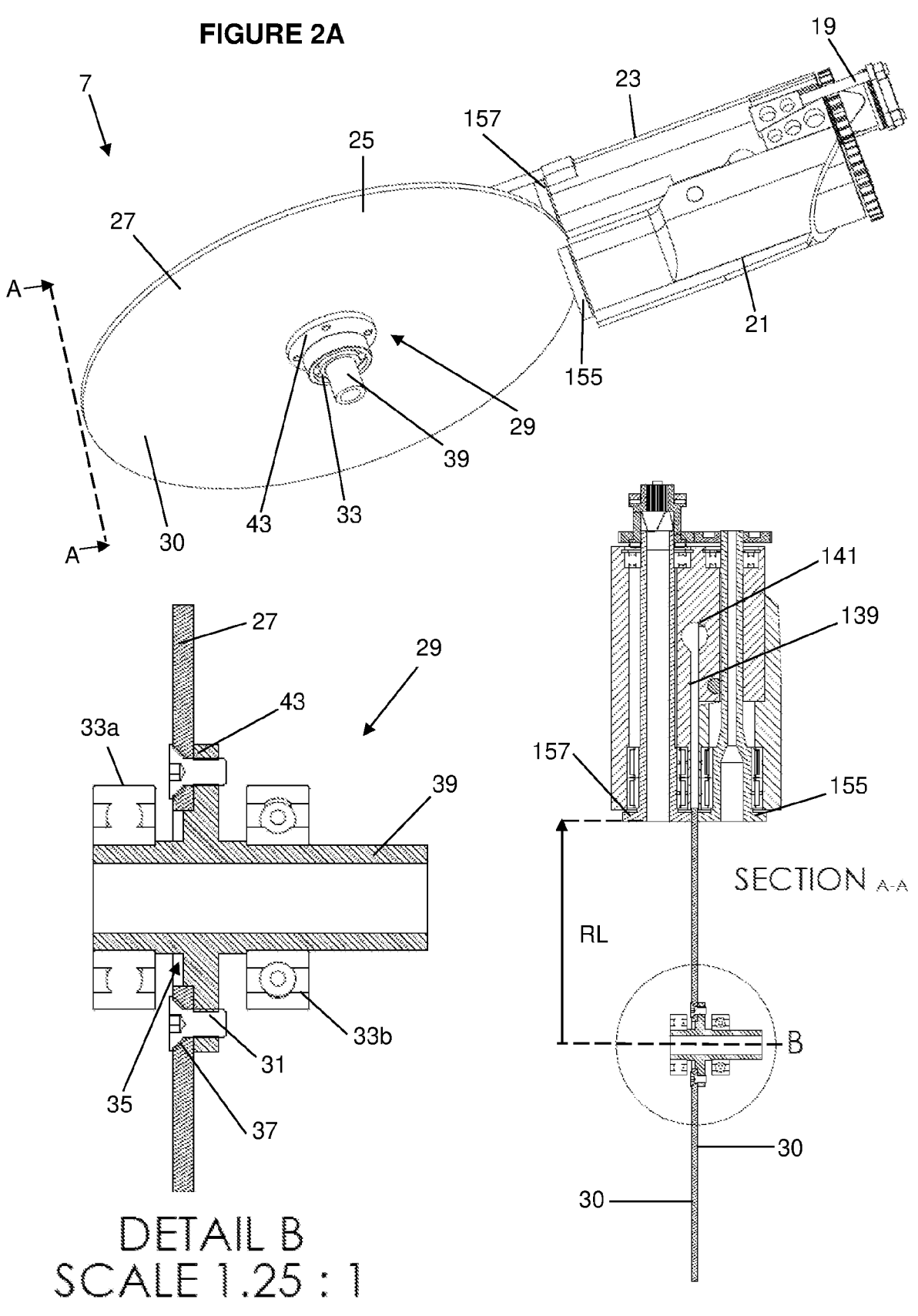
FIGS. 2A-2C are respectively a perspective view, sectional view and enlarged view of the CVT unit.

Disk Unit [25]—FIGS. 2A & 2C

The disk unit [25] includes a circular, central friction drive disk [27] with a central bore [35] extending through the drive disk [27] and defining two opposite side traction drive surfaces [30]. Four countersunk holes [37] are equally spaced around the central bore [35]. The disk unit [25] further includes a central hub [29] comprising a hollow shaft [39] which extends through the central bore [35], and a circular hub flange [43] extending radially outwardly from the hollow shaft [39] such that the hub flange [43] presses against the drive disk [27]. Four countersunk screws [31] extend through the hub flange [43] and countersunk holes [37] of the drive disk [27] to secure the central hub [29] in place. Two ball bearings [33] are located on hollow shaft [39] on either side of the drive disk [27], with the hollow shaft [39] being arranged flush with the one ball bearing [33a], and with the shaft [39] protruding beyond the other ball bearing [33b].

Figures 3A, 3B:
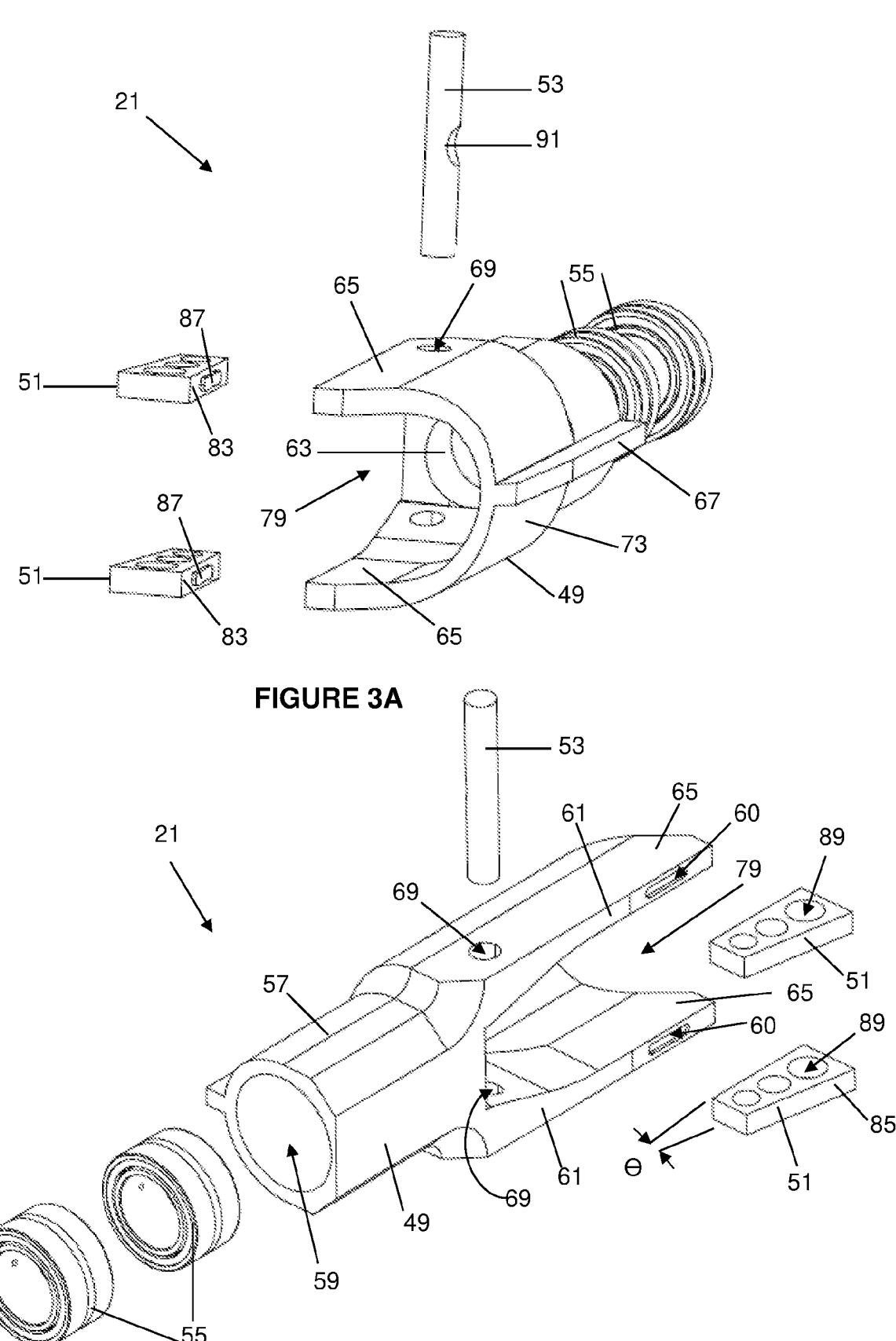
FIGS. 3A-3B are two perspective exploded side views of the top clamp unit.

Top Clamp Unit [21]—FIGS. 3A & 3B

The top clamp unit [21], which is best illustrated in FIGS. 3A and 3B, includes a top clamp frame [49], two clamp wedges [51], a swivel pin [53], and two needle bearings [55].

The top clamp frame [49] comprises a hollow, cylindrical body [57] terminating at one end thereof in two substantially planar legs [65] extending parallel to each other from radially opposite sides of the cylindrical body [57]. A substantially semi-circular bridge [73] is connected to and extends between sidewalls of the legs [65] to define a substantially U-shaped cavity [79] between the legs [65], bridge [73] and cylindrical body [57]. A bore [59] extends through the cylindrical body [57] and defines a step [63] of reduced diameter where the cylindrical body [57] extends into the planar legs [65]. An elongate rib [67] extends radially outwardly from, and the length of, the cylindrical body [57] and the bridge [73], in a plane parallel to the planar legs [65]. The opposite sidewalls [61] of the legs each includes a pocket [60] extending into the sidewall [61]. Two aligned holes [69] extend through each of the planar legs [65] for accommodating the swivel pin [53] therethrough.

The swivel pin [53] includes a semi-circular cut-out [91] midway the pin length. In an assembled configuration, swivel pin [53] is located through holes [69] such that its opposite ends are flush with the planar legs [65] and the pin [53] is perpendicularly orientated relative to the elongate axis of bore [59].

The clamp wedges [51] each include a top surface [83] and bottom surface [85], with the angle between the top and bottom surfaces [83; 85] being defined as e. The top surface [83] includes a raised formation [87] protruding from the wedge [51], and a number of weight reduction holes [89] protruding through the wedge [51].

In an assembled configuration of top clamp unit [21], needle bearings [55] are located next to each other in central bore [59] against step [63], while swivel pin [53] is located through holes [69] such that cut-out [91] is concentric with central bore [59]. The clamp wedges [51] are located with top surface [83] pressed against sidewalls [61] of the parallel legs [65], while the raised formations [87] of the wedges [51] mate with pockets [60] to secure the clamp wedges [51] on the legs [65]. The remainder of the shapes and features of the top clamp unit [21] are designed for weight and strength optimization and are not discussed further.

Figure 4A:
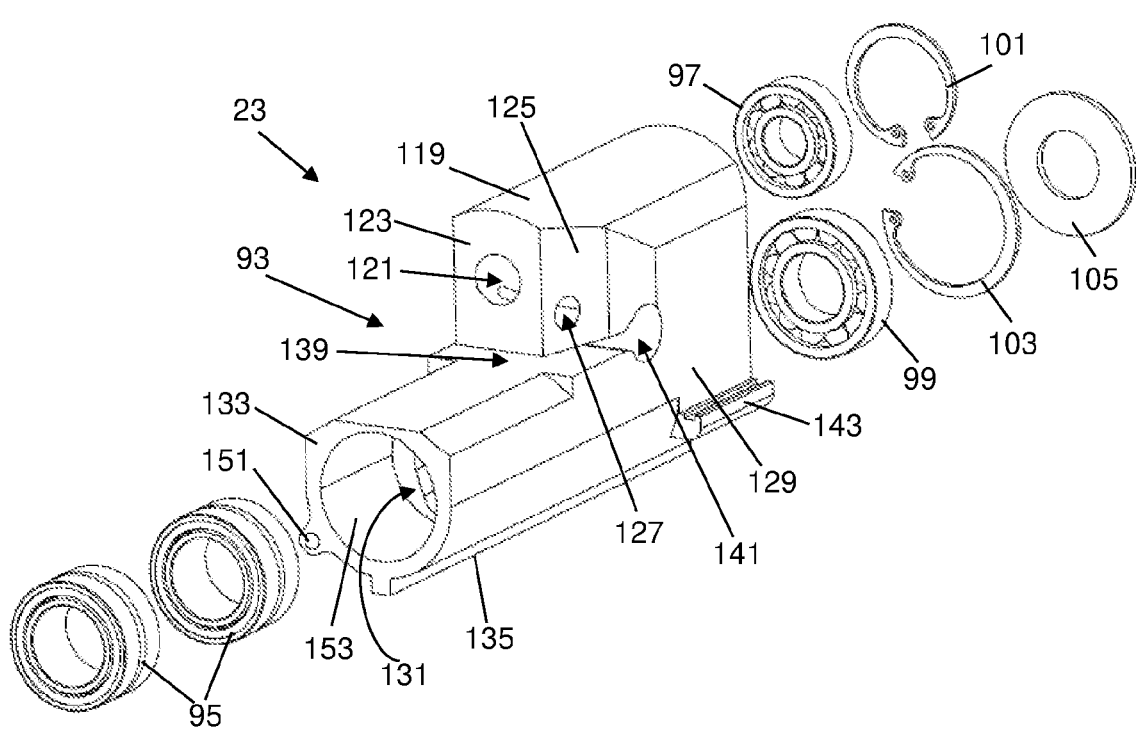
FIGS. 4A-4B are two perspective exploded side views of the bottom clamp unit.
Figure 4B:
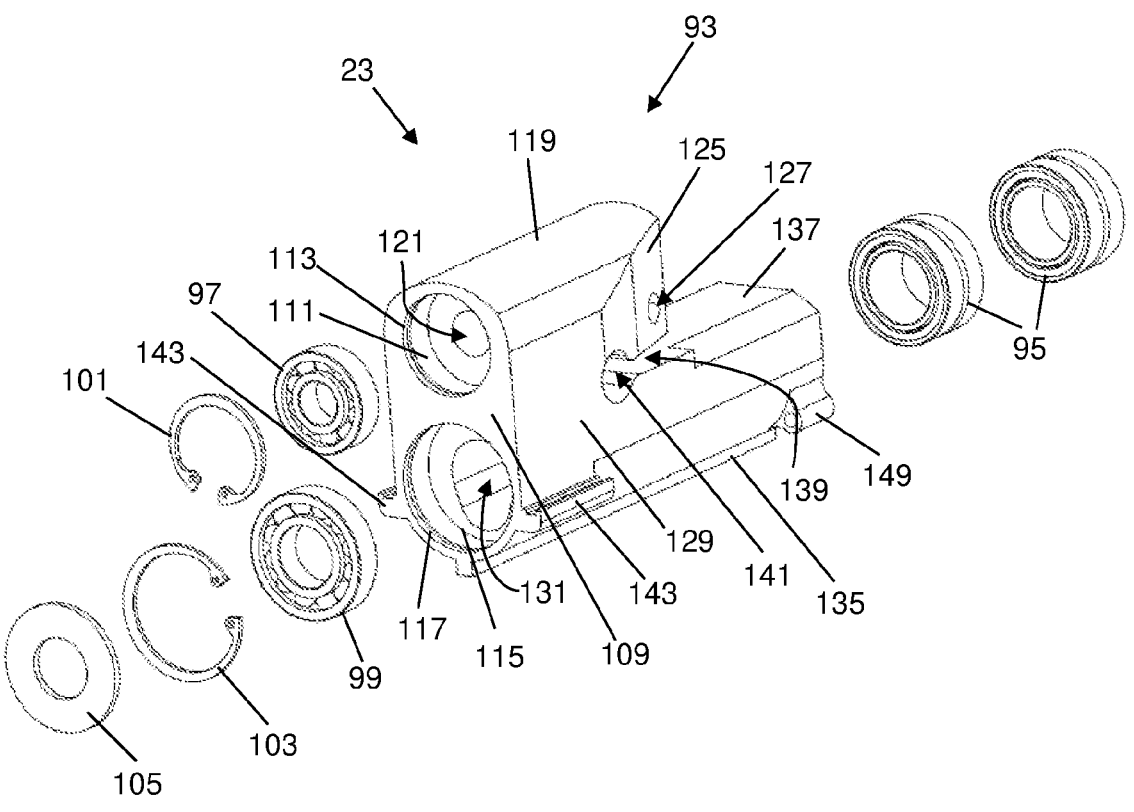

Bottom Clamp Unit [23]—FIGS. 4A and 4B

Bottom clamp unit [23], as can most clearly be seen in the exploded views of FIGS. 4A and 4B, includes a bottom clamp frame [93], two needle bearings [95], a top ball bearing [97], a bottom ball bearing [99], a top c-clip [101], a bottom c-clip [103], and a washer [105].

Bottom clamp frame [93] includes a shorter top section [119] and a longer, substantially parallel bottom section [129], with a slot [139] being defined between the top and bottom sections [119; 129]. The slot [139] terminates in a semi-circular cut-out [141]. Both the top and bottom sections [119; 129] terminate at one end in a common front face [109], but top section [119] terminates at its opposite end in rear face [123], which includes angled faces [125] on either side; while bottom section [129] terminates at its opposite end in rear face [133] and defines top face [137]. A bore [121] extends through the top section [119], with a top bearing pocket [111] and C-clip groove [113] sunk into front face [109] concentrically with bore [121] and configured for housing top ball bearing [97]. A non-circular bore [131] extends through bottom section [129], with a bottom bearing pocket [115] and C-clip groove [117] sunk into front face [109] concentrically with bore [131] and configured for housing bottom ball bearing [99].

A hole [127] extends through angled faces [125] in a direction which is parallel to face [123] and perpendicular to the bore axes of bores [121] and [131]. An elongate rib [135] extends substantially the length of bottom section [129]; while two shorter ribs [143] run parallel to each other from opposite sides, and partially the length of, bottom section [129]. Face [133] includes a lead screw formation [149] with a threaded hole [151] extending therethrough for mating with a leadscrew. Bearing pocket [153] is sunk into face [133] concentric with bore [131] and bearing pocket [115]. The remainder of the shapes and features of the bottom clamp unit [23] are designed for weight and strength optimization and are not discussed further.

In the assembled configuration of bottom clamp unit [23], ball bearing [97] is secured in bearing pocket [111] through engagement of C-clip [101] into groove [113]; ball bearing [99] is secured in bearing pocket [115] through engagement of C-clip [103] in groove [117]; while washer [105] is located against C-clip [103] in bearing pocket [115]. Needle bearings [95] are located next to each other in bearing pocket [153].

Figures 5A, 5B:
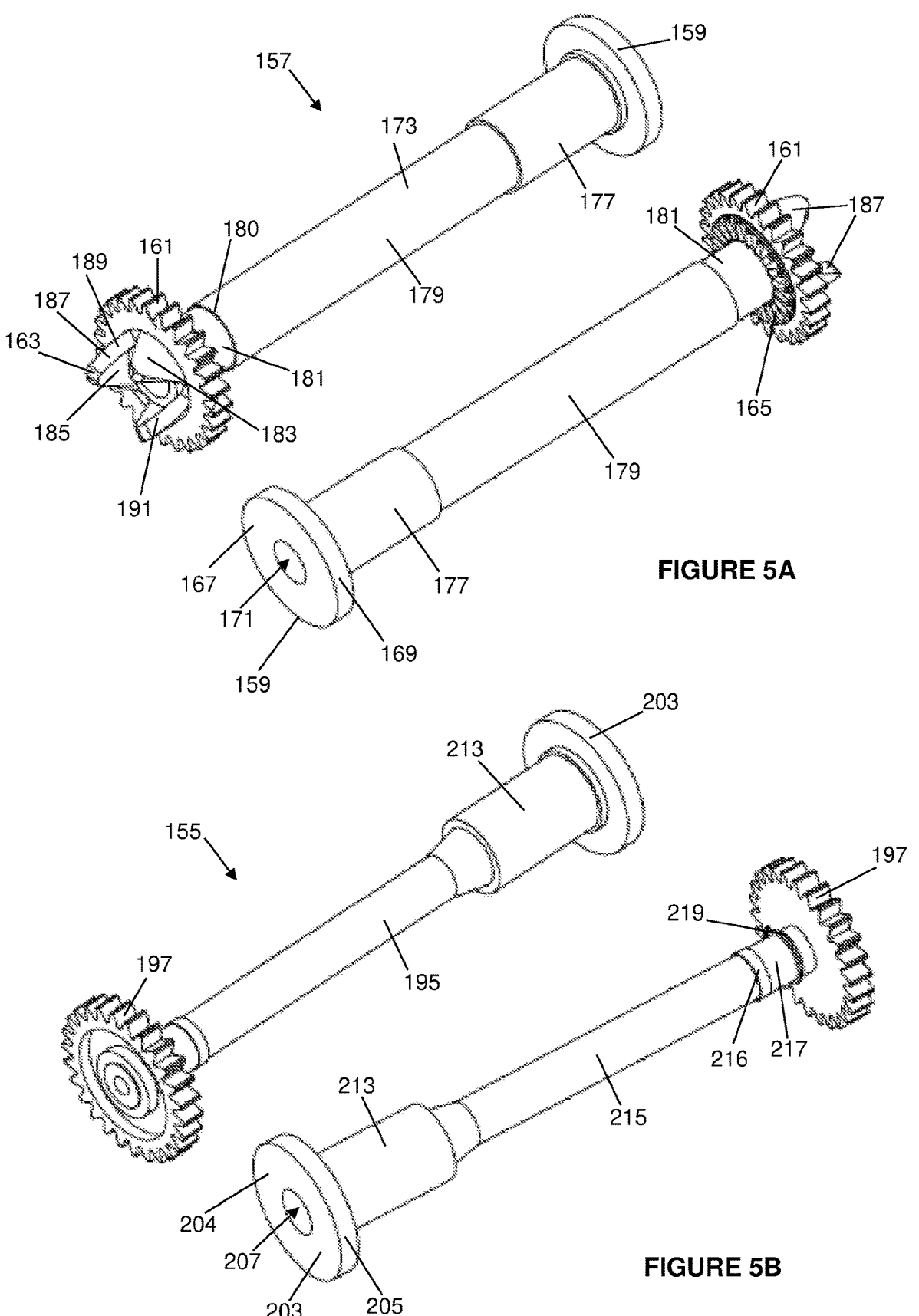
FIG. 5A illustrates two perspective views of the bottom roller unit, at opposite angles of rotation.
FIG. 5B illustates two perspective views of the top roller unit, at opposite angles of rotation.
Figure 6A:
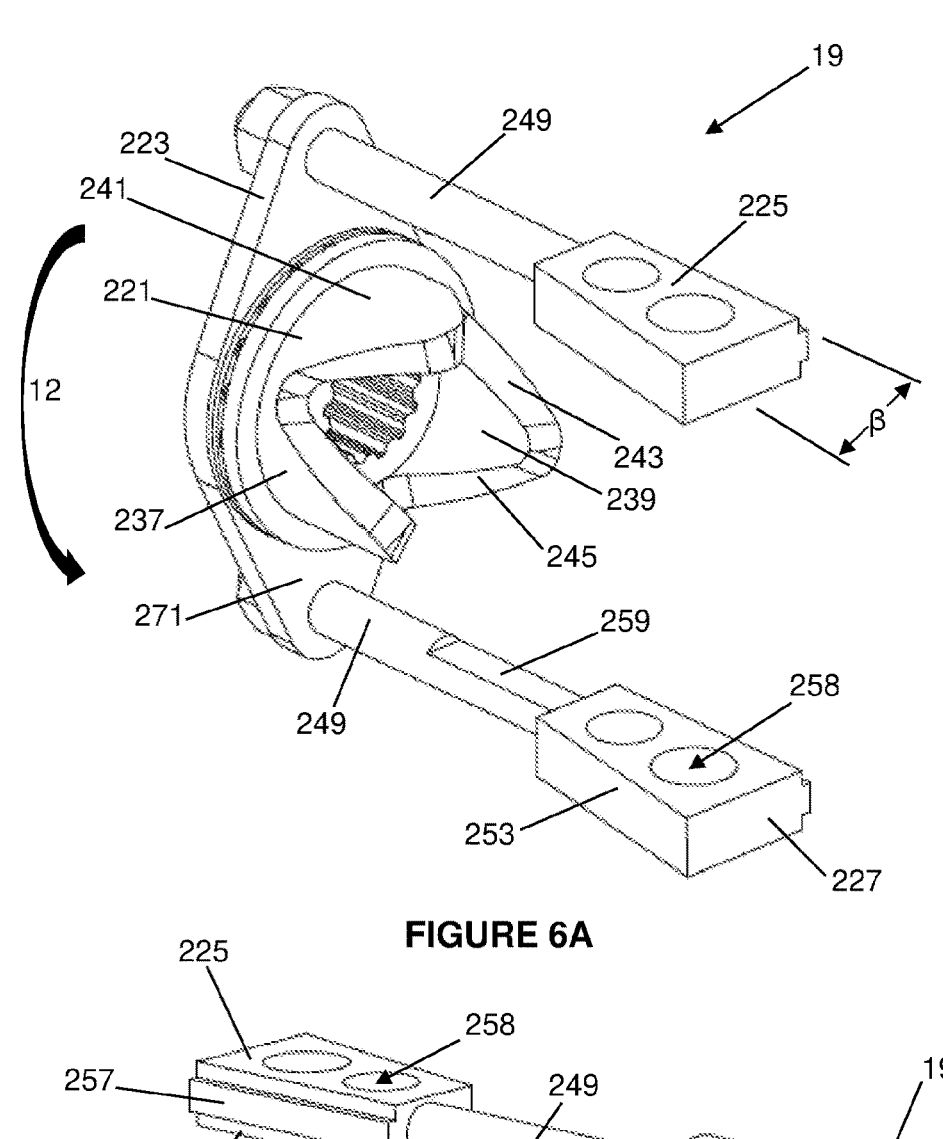
FIGS. 6A-6B illustrate two perspective views, at opposite angles of rotation, of the loading cam unit.
Figure 6B:
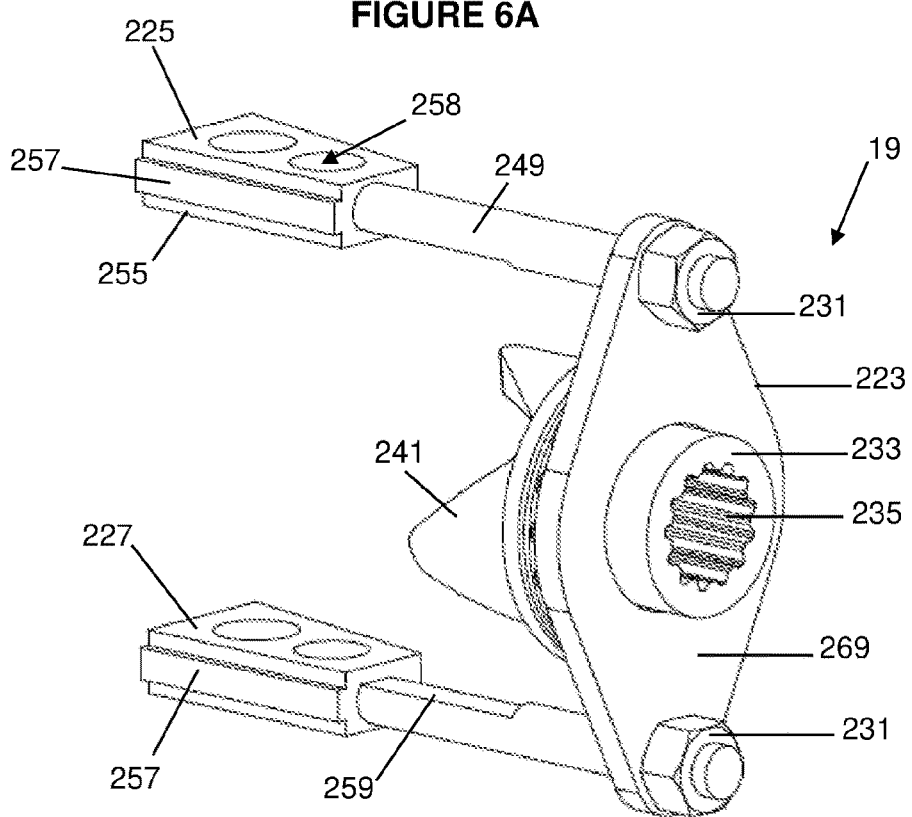

Bottom Roller Unit [157]—FIG. 5A

Bottom roller unit [157], illustrated in FIG. 5A, includes a hollow, elongate first roller shaft [173] with a bore [171] extending through the shaft [173], the shaft [173] terminating at one end thereof in a bottom roller [159]; and terminating at an opposite end thereof in a bottom gear [161], needle thrust bearing [165] and loading cam [163].

The bottom roller [159] includes a traction drive disk [167] with a peripheral traction drive rim [169] and a central hole concentrically aligned with bore [171].

Shaft [173] comprises a roller-carrying shaft section [177], which steps down into a smaller diameter intermediate shaft section [179], which in turn steps down into a yet-smaller diameter bearing-carrying shaft section [181] at step [180].

The loading cam [163] includes three identical, cylindrically evenly spaced, axially protruding cam lobes [187]. Each cam lobe [187] comprises an external face [183], an internal face [185], a first cam face [189], and a second cam face [191], with cam faces [189] and [191] representing a helical surface defining a certain lead with units of m/rev, while the helical surface rotation direction for cam faces [189] and [191] are in opposite directions.

Bottom gear [161] is a spur gear and is, together with loading cam [163], attached to bearing-carrying shaft section [181]. Needle thrust bearing [165] is located rotatably around bearing-carrying shaft section [181].

Top Roller Unit [155]—FIG. 5B

Top roller unit [155], illustrated in FIG. 5B, includes a hollow, elongate shaft [195] with a bore [207] extending through the shaft [195], the shaft [195] terminating at one end thereof in a top roller [203]; and at terminating at an opposite end thereof in a top gear [197] and C-clip [219]. Top gear [197] and bottom gear [161] have the same number of teeth and width.

The top roller [155] includes a traction drive disk [204] with a peripheral traction drive rim [205] and a central hole concentrically aligned with bore [207].

Shaft [195] comprises a roller-carrying shaft section [213], which tapers down into a smaller diameter intermediate shaft section [215], which in turn steps down into a yet-smaller diameter bearing-carrying shaft section [217] at step [216].

Loading Cam Unit [19]—FIGS. 6A-6D

Loading cam unit [19], which is illustrated in FIGS. 6A-6D, includes a cam plate [223], a loading cam [221] connected to and extending through the cam plate [223], and two wedges [225; 227] connected to and extending from the cam plate [223].

The cam plate [223] is a substantially equilateral quadrilateral plate including a front face [269], a rear face [271], a cam-accommodating central hole [265], and two laterally-spaced wedge-arms carrying holes [267].

The loading cam [221] comprises a hollow cam shaft [233] which extends through the cam-accommodating central hole [265] of the cam plate [223] and which includes a splined centre bore [235]; and three identical, cylindrically evenly spaced, axially protruding cam lobes [241] extending from the cam shaft [233]. A needle thrust bearing [229] is positioned intermediate the loading cam [221] and the cam plate [223]. Each cam lobe [241] includes an external face [237], an internal face [239], a first cam face [243], and a second cam face [245]. Each of cam faces [243] and [245] represents a helical surface defining a certain lead with units of m/rev, while the helical surface rotation direction for cam faces [243] and [245] are in opposite directions. In the transition from the cam shaft [233] to the cam lobes [241] a step [247] is defined.

Loading cam unit [19] includes two elongate wedge-carrying arms [249] that extend parallel to each other from the cam plate [223] in the same direction as the cam lobes [241]. The wedge-carrying arms [249] protrude through the wedge-arms carrying holes [267] of the cam plate [223] and are secured to the cam plate [223] through nuts [231]. At their free ends the wedge-carrying arms [249] each terminates in a wedge [225; 227]. Each wedge [225; 227] includes a bottom face [253] and a top face [255], with a rib [257] extending from the top face [255]. Bottom face [253] and top face [255] define an angle β between them. (Angle β may be equal to angle Θ) The wedge-carrying arms [249] each include an elongate cut-out [259] approximate the wedge [225; 227]. The wedges [225; 227] each includes a number of weight-reducing holes [258] extending through the wedges.

In the assembled configuration of loading cam unit [19], loading cam [221] is rotatably located in cam plate [223] with cam shaft [233] extending through central hole [265], while the thrust needle bearing [229] is rotatably located around cam shaft [233] and sandwiched between the rear face [271] of cam plate [223] and loading cam [221]. Top wedge [225] and bottom wedge [227] are located in cam plate [223] with their respective shafts [249] secured in cam plate [223], the wedges [255; 227] being orientated in such a way that the cut-outs [259] face each other and are perpendicular to a plane through the axes of the two shafts [249].

Figure 7:
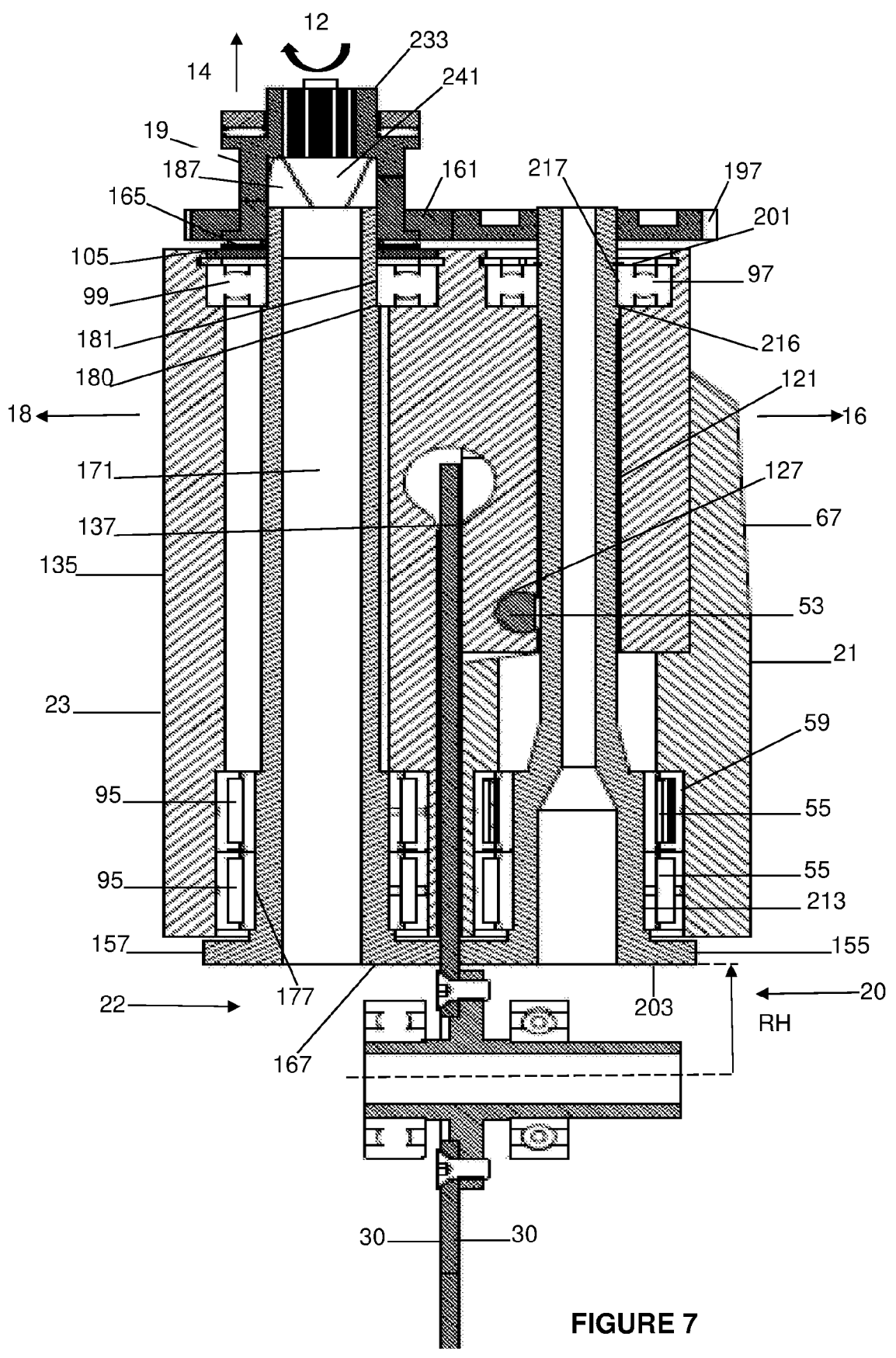
FIG. 7 is a sectional view of the CVT unit in the RH ratio.

Assembled CVT Unit [7]—FIG. 7

FIG. 7 illustrates a sectional view of the assembled CVT unit [7] of the invention. Bottom clamp unit [23] and top clamp unit [21] are assembled by locating top section [119] of bottom clamp unit [23] into the cavity [79] of top clamp unit [21] in such an orientation that central bore [121] of the top section [119] is concentric with central bore [59] of the top clamp unit [21]. The assembly is secured in place through swivel pin [53] which extends through holes [69] of the top clamp unit and hole [127] of the bottom clamp unit [23].

Top roller unit [155] is rotatably located within the bottom clamp unit [23] such that it extends through central bore [121] and bore [59]. At one end of the top roller unit [155], bearing-carrying shaft section [217] is located in ball bearing [97] and secured in place with C-clip [201], while on the other end of the top roller unit [155], roller-carrying shaft section [213] is located in needle bearings [55].

Bottom roller unit [157] is rotatably located in bottom clamp unit [23] such that it extends through non-circular bore [131]. At one end of the bottom roller unit [157], roller-carrying shaft section [177] is located in the two needle bearings [95], while at the other end of the bottom roller unit [157], bearing-carrying shaft section [181] is located in ball bearing [99] such that the side of ball bearing [99] bears against step [180] to secure the bottom roller unit [157] in one axial direction. To secure it in the other axial direction, needle thrust bearing [165] is rotatably engaged with washer [105].

Bottom gear [161] (of bottom roller unit [157]) and top gear [197] (of top roller unit [155]) are meshed and able to drive each other.

Loading cam unit [19] is axially slidably located with shaft [233] concentrically aligned with centre bore [171] of shaft [179] (bottom roller unit [157]), such that the bottom surfaces [253] of top and bottom wedges [225; 227] slide on bottom surfaces [85] of clamp wedges [51] (see FIG. 3); while the top surfaces [255] and raised ribs [257] of the loading cam unit [19] slide on the complimentary shaped ribs [143] of the bottom clamp unit [23].

The cam lobes [241] of loading cam [221] (loading cam unit [19]) are located in-between the cam lobes [187] of loading cam [163] (bottom roller unit [157]) as can most clearly be seen in FIG. 7. Loading cams [221] and [163] may have the same spiral lead and identical cam lobes [241; 187]. The splined central bore [235] of loading cam [221] is axially slidably engaged with the complementary shaped splined drive shaft [15] of intermediate shaft [5].

CVT Unit [7] Functioning

Upon application of human power to the pedal arms [11] via the pedals (not shown), the crank unit [3] rotates in the direction of arrow [10] (see FIG. 1A). As a result, bevel gear [13] drives the intermediate shaft [5] via pinion [17]; while the splined drive shaft [15] drives the loading cam [221] via the splined central bore [235] in the direction of arrow [12]. First cam faces [243] of loading cam [221] (loading cam unit [19]) engage second cam faces [191] of loading cam [163] (bottom roller unit [157]), and as torque is applied, the two loading cams [221] and [163] experience a force pushing them away from each other in an axial direction, as is the case with loading cams in practice. Loading cam unit [19] therefore experiences a force in the direction of arrow [14] (refer FIG. 7), and this force causes top wedge [225] and bottom wedge [227] to force the top clamp unit [21] and bottom clamp unit [23] away from each other in the direction of arrows [16] and [18] respectively (refer FIG. 7).

Since the top clamp unit [21] and bottom clamp unit [23] are effectively hinged together around swivel pin [53], the other ends of top clamp unit [21] and bottom clamp unit [23] are forced together in the directions of arrows [20] and [22] respectively. This force is transferred to the traction drive disks [203; 167], which then between them clamp the traction drive surfaces [30] of disk unit [25] to establish a traction drive between the traction drive disks [203; 167]

and the drive disk [27] where the traction drive rims [205; 169] are in traction drive contact with traction drive surfaces [30].

Simultaneously while this is happening, the loading cam [221] drives loading cam [163], which in turn drives the drive disk [167], which it is attached to, as well as drive disk [203] via the meshing of gears [161] and [197]. The disk unit [25] may be connected to a bicycle wheel. During operation, the axis of disk unit [25] coincides with the plane defined by the axes of the traction drive disks [203; 167], while the traction drive surfaces [30] remain parallel to face [137].

In load conditions, when the torque between the disk unit [25] and crank [3] is reversed, which typically occur during regenerative braking (as is presented in more detail in the following sections), loading cam [163] will drive loading cam [221] and cam surfaces [245; 189] will engage, while the same forces as described above will be experienced by the system, as is common with bi-directional axial loading cam design practice.

Ratio Variation Functioning

In order to vary the mechanical ratio between the intermediate drive shaft [15] and the disk unit [25], the distance between the axis of the disk unit [25] and traction drive disks [203; 167] is varied from the value denoted by RL in FIG. 2, to the value of RH in FIG. 7. In this case the drive disk [27] has moved into slot [139] up to circular cut-out [141], therefore moving the traction drive contact point from close to the rim of drive disk [27] to close to the axis of drive disk [27] to create the ratio variation.

Figures 8A, 8B, 8C:
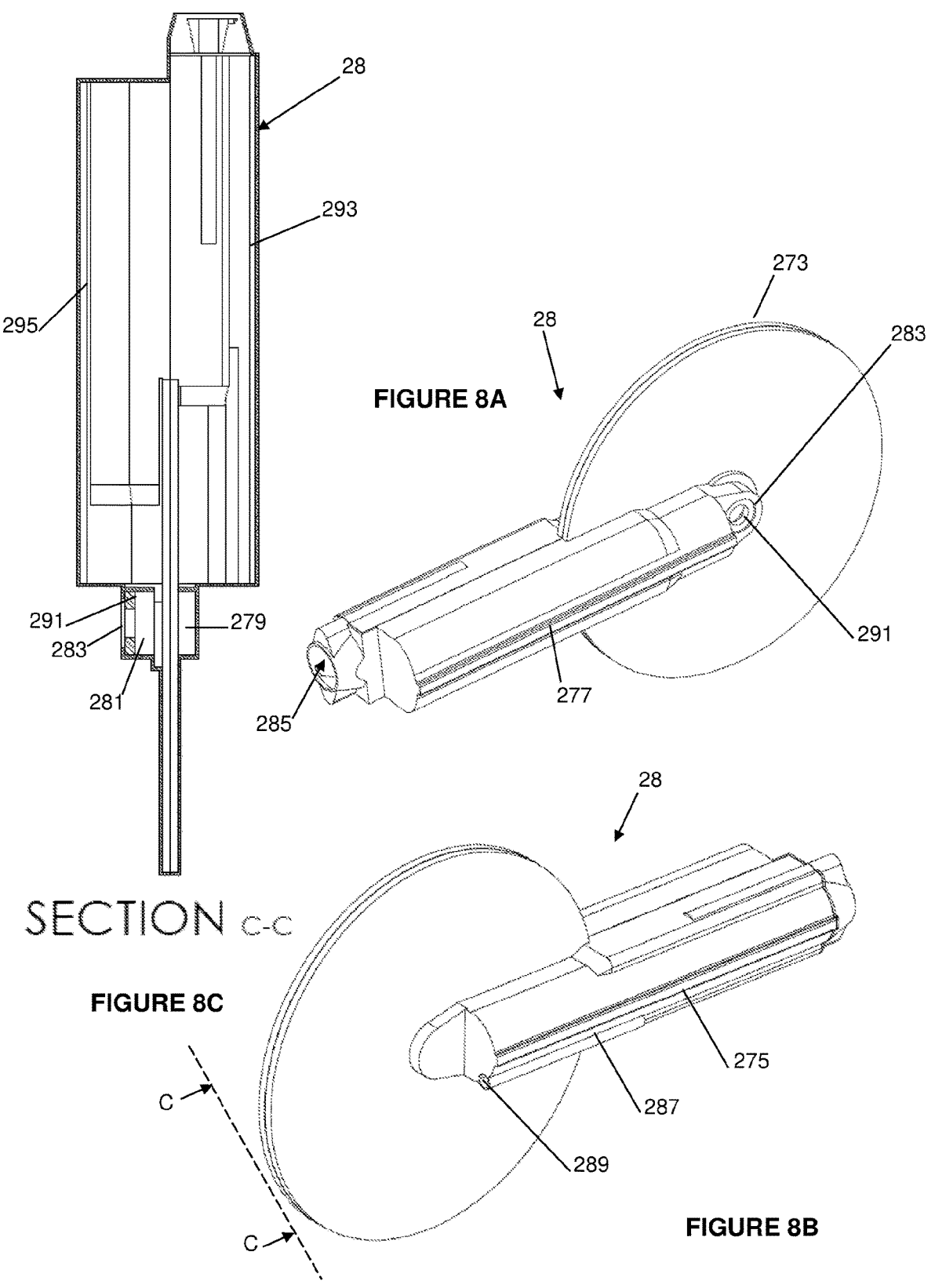
FIGS. 8A-8C illustrate two perspective views at opposite angles of rotation, and a sectional view of the casing unit.

Casing Unit 28—FIG. 8

The purpose of casing unit [28] (illustrated in FIG. 8) is to keep the components of the CVT unit [7] in the configuration described above, while allowing for the relative ratio movement between the drive disk [27] and traction drive disks [203; 167] from RL to RH. Another function of the casing unit [28] is to provide an enclosure to allow for the containment of traction fluid oil on all rotating components.

Casing unit [28] includes a thin-walled body [273], including external ribs [275; 277], bearing pockets [279; 281], a CVT output opening [283], a CVT input opening [285], and a ratio rube formation [287] arranged parallel with ribs [275; 277], including ratio opening [289], and an oil seal [291]. Inside the casing unit [28], ribs [275; 277] create slots [293; 295] respectively, while oil seal [291] is located to the outer side of bearing pocket [281].

In the assembled CVT unit [7], two bearings [33] are located in bearing pockets [279; 281], while shaft [39] extends through opening [283] and seal [291] seals on it. Ribs [67; 135] are slidably located in slots [295; 293] respectively to guide the relevant components during above ratio movement from RL to RH, while the inside of casing unit [28] is spacious enough to allow for this movement. Opening [285] allows for the CVT unit [7] to receive input via splined drive shaft [15]. Any suitable seals/means may be used at this opening, or the whole bicycle drive train of the invention [1] may be enclosed in the casing unit [28].

A servo unit [297] (refer FIG. 1), which includes a leadscrew, may be attached to the casing unit [28], while the leadscrew extends through ratio opening [289], down tube [287], while being threaded into threaded hole [151] to adjust the CVT unit [7] ratio from RL to RH when operating servo [297] via any suitable means.

The remainder of the casing unit [28] is suitably shaped, typically manufactured from sheet metal/aluminium or carbon fibre or any suitable material to provide an oil tight enclosure for the CVT unit [7]. The casing unit [28] may have multiple sections to facilitate manufacturing, while it may also form part of the bicycle frame or suspension it is installed in, as will be presented in more detail in the following sections.

Figure 9:
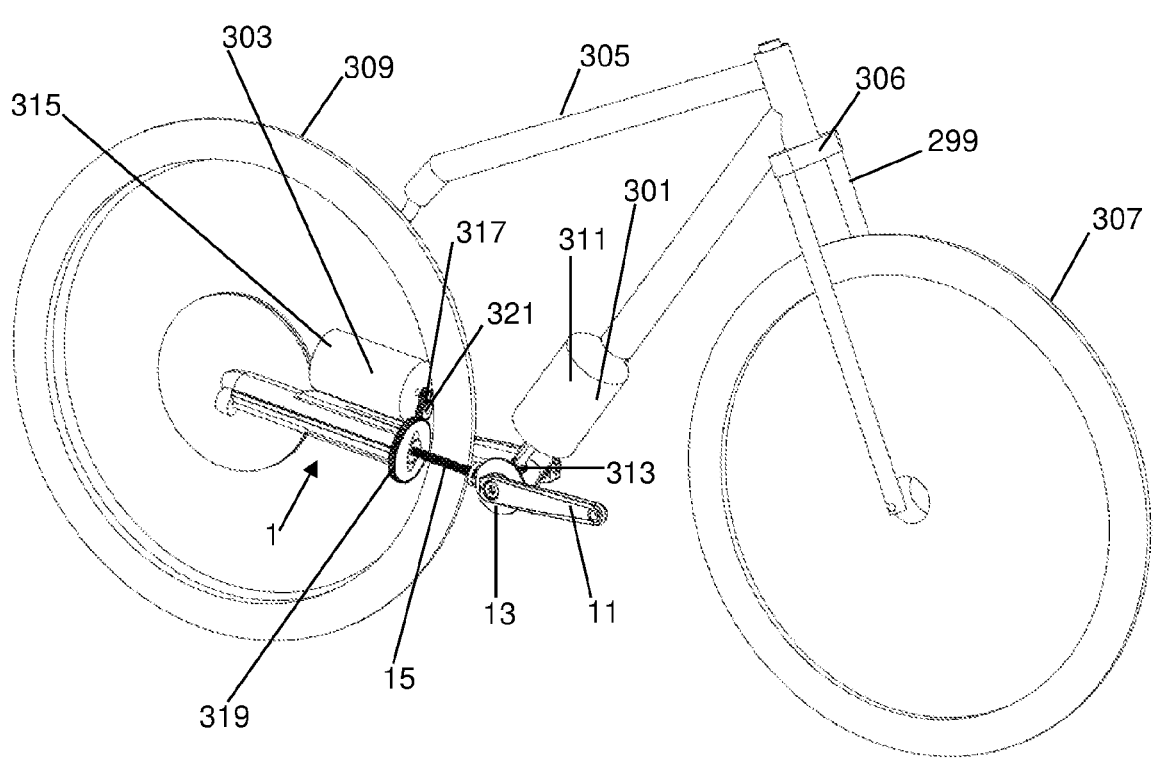
FIG. 9 is a side view of embodiment A of the invention.

Bicycle Integration Embodiment A—FIG. 9

The first embodiment of the bicycle drive train of the invention [1] into a bicycle [299] is presented in FIG. 9. It includes the bicycle drive train of the invention [1], a first electric motor unit [301], and a second electric motor unit [303]. The bicycle [299] includes a partial frame [305], fork [306], a front wheel [307], and a rear wheel [309]. (The bicycle [299] is illustrated only with basic parts to demonstrate the configurations that are possible when integrating the bicycle drive train [1] of the invention, and therefore no further features are illustrated). In this embodiment, the casing unit [28], may form part of the frame [305] of bicycle the [299] or rear suspension (not shown), while hub [29] may be concentric with the rear wheel [309] and attached and integrated with it.

In this embodiment A, where the bicycle [299] is an electric bicycle, the first electric motor unit [301] may be integrated, including an electric motor [311] and a bevel gear [313] attached to it, while the bevel gear [313] is meshed and engaged with bevel gear [13]. The second electric motor unit [303] may be integrated, including an electric motor [315], with a spur gear [317] attached to it, driving a larger spur gear [319] via idler gear [321], while being attached to splined drive shaft [15]. Any of above motor units may be employed or both to provide electric drive from the respective motor unit, through the CVT unit [7] and to the rear wheel [309].

Figure 10:
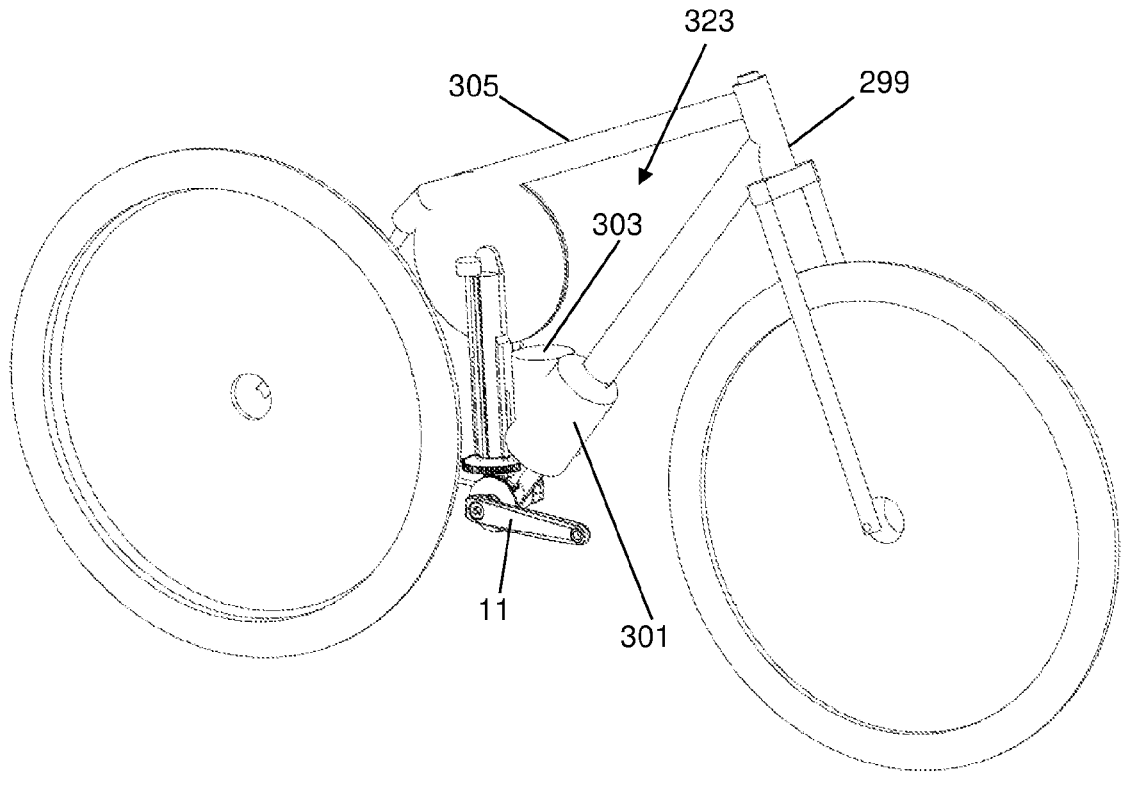
FIG. 10 is a side view of embodiment B of the invention.

Bicycle Integration Embodiment B—FIG. 10

The second embodiment of the bicycle drive train [1] of the invention into a bicycle [299] is presented in FIG. 10 and includes the same components as in the FIG. 9 embodiment A, but with the following differences. The CVT unit [7] is now orientated as such that the disk unit [25] is located within the frame triangle [323]. This embodiment would additionally require a drive (for example in the form of a belt or chain) from the hub [29] to the rear wheel [309]. In this embodiment B, the CVT unit [7] is also located closer to the crank unit [3] and would require a shorter splined drive shaft [15]. The electric motor units [301; 303] interfere, thus only one or the other can be employed. When a rear suspension is employed, a high pivot suspension is typically employed.

Alternative Embodiments

It is to be appreciated that the CVT unit [7] and crank unit [3] may be configured in any suitable configuration and location within the bicycle [299] to provide drive from the crank unit [3] to the rear wheel [309]. For example, the disk unit [25] may be configured concentric with the crank unit [3] and would also require an additional drive to the rear wheel [309], as is the case with embodiment B above.

It is to be appreciated that in all above embodiments, drive in both directions is possible, that is from the rear wheel [309] to any of the motor units [301; 303] (performing regenerative braking), as well as from the respective motor units [301; 303] to the rear wheel [309] (performing rider electric assistance). In both above drive directions, as well as the drive from the rider, passes through the CVT unit [7] and therefore the CVT unit [7] can adjust the ratio to optimise, for example, regenerative braking or rider comfort, or any feature affected by the mechanical drive ratio of the bicycle [299] as is implemented by the CVT unit [7].

Free Wheeling

In order to allow the pedal arms [11] to be stationary while the bicycle [299] is moving, a one-way clutch, sprag or pawl may be integrated between the bevel gear [13] and crank shaft [9]. Alternatively, a one-way clutch or sprag or pawl may be integrated between the splined drive shaft [15] and the bevel gear pinion [17]. However, in this case only motor unit [303] can be used since with motor unit [301] regenerative braking will not be possible.

Ratio Actuation

As mentioned above, the ratio can be changed via the servo motor [297]. This servo motor may be controlled by an automatic control system and suitable algorithm which may receive as input for example:

Rider inputs: heart rate, fitness level, mode setting (for example sport or economy)

Terrain/environment inputs: altitude, inclination, road conditions, temperature, wind Battery: charge level, distance to end of trip The infinite ratio adjustment capability of the bicycle drive train [1] makes it possible for real-time continuous ratio adjustment and it is to be appreciated that abovementioned parameters may automatically be collected in real-time via blue tooth, GPS, wi-fi, etc. The ratio actuation may also be adjusted manually and mechanically via, for example, the prior art shifter cable systems found on existing commercial bicycles, which may move the bicycle drive train [1] from RL to RH in a fixed number of increments representing fixed ratios, as is common with existing multi-speed ratio bicycle systems. It is also to be appreciated that the bicycle drive train [1] may be applied to e-bikes, as well as standard bicycles, without any electric systems and that the bicycle drive train [1] may be rider-controlled in a pure mechanical fashion.

Suspension Compatibility

In embodiments A and B and others mentioned above, the bicycle drive train [1] is fully compatible with a rear suspension where, in the case of embodiment A, the bicycle drive train [1] may form part of the rear suspension arms, while pivoting around the crank. In the second case of embodiment B, a high pivot suspension, as is implemented in the Zerode bicycles, may be used.

No Torque Limitations with Optimized Efficiency

With the inclusion of the loading cam system, the bicycle drive train [1] will only clamp the drive disk [27] between disks [203] and [167] with an optimized force directly related to the crank and or motor torque to provide optimal efficiency as well as eliminate any torque limitations, while the ratio varies from RL to RH. The constant input radius of disks [203; 167] further facilitates above as the tangential traction drive force on rims [205; 169] for a given crank and or motor torque remains constant.

Figure 11:
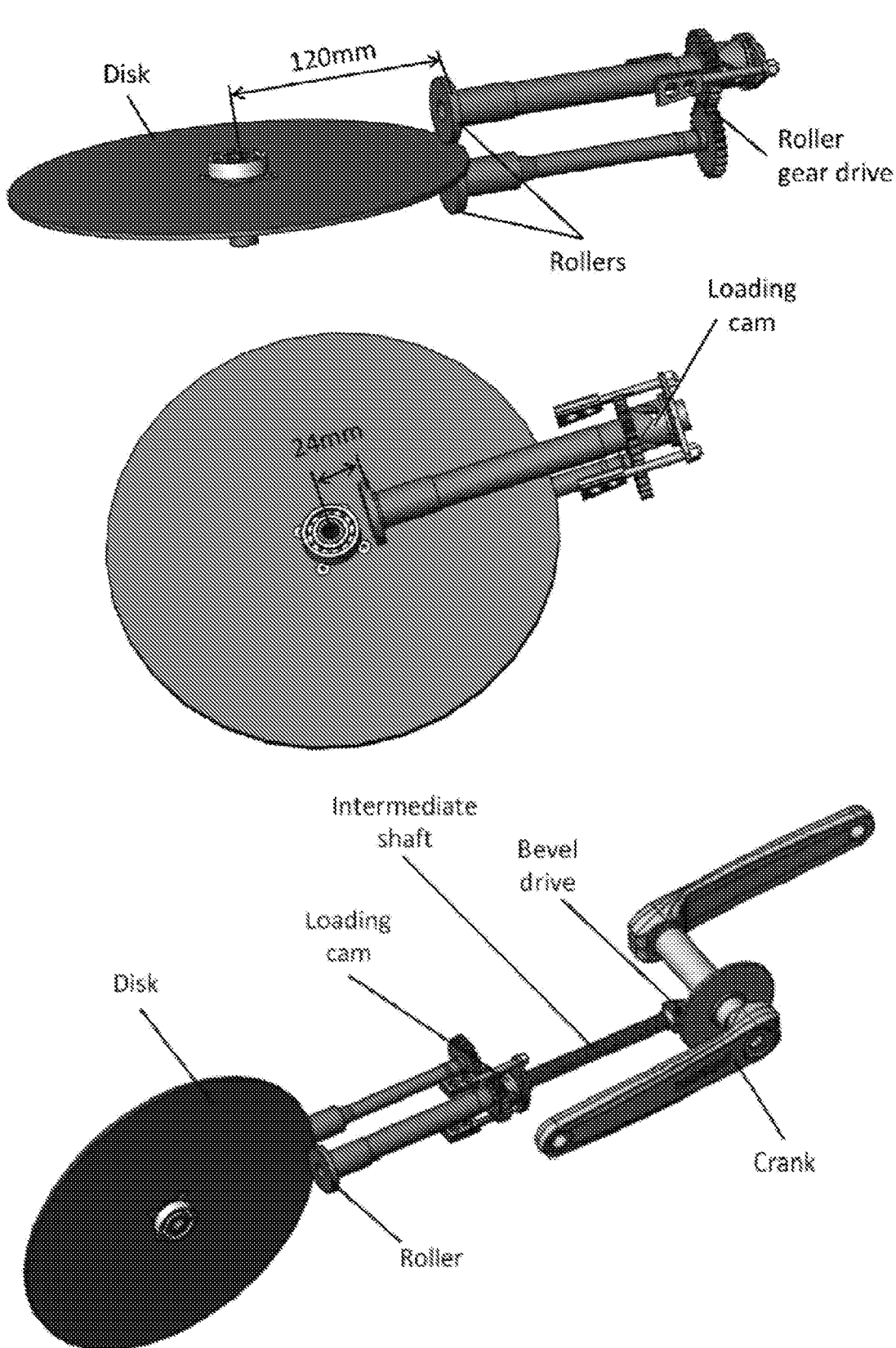
FIGS. 11-12 further illustrate the manner in which the different component parts of the bicycle drive train are integrated.
Figure 12:
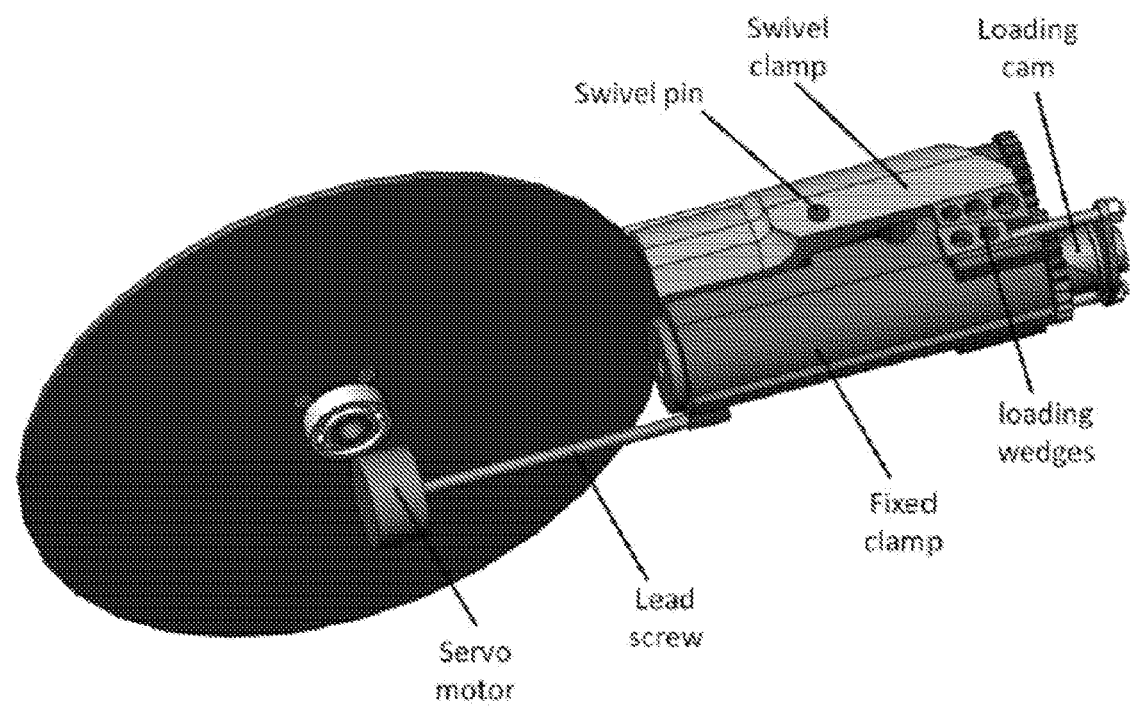
Figure 12:
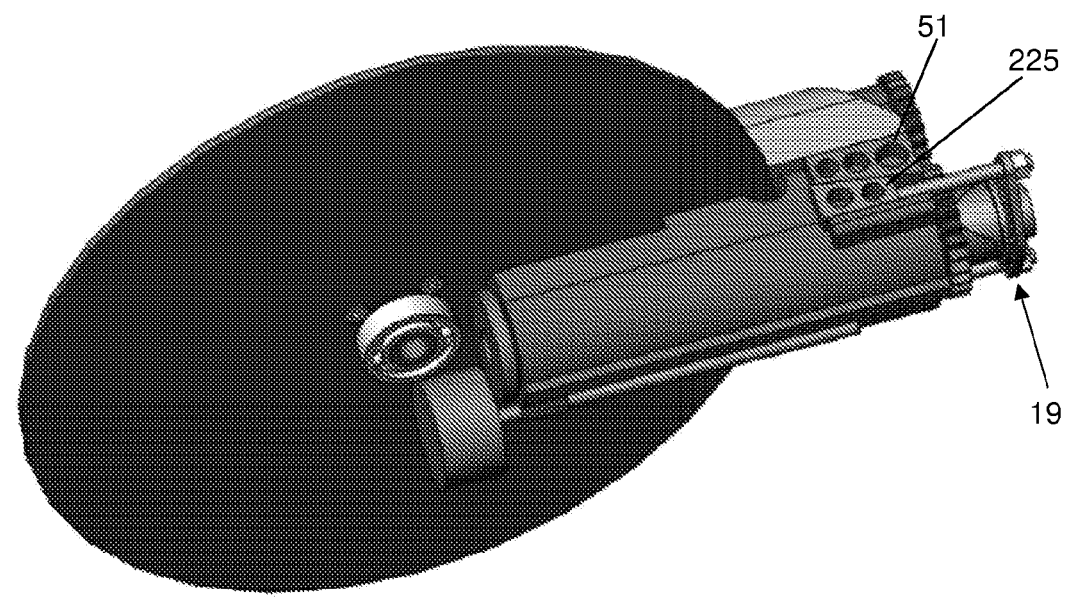

The traction drive fluid may be commercially available Santotrac 50 or 35A or any other suitable traction drive fluid. Commercial traction fluid typically establishes a coefficient of friction of about 0.1 between two hardened steel surfaces under high pressure, therefore the clamping force on the roller needs to be approximately 10 times higher than the tangent traction drive driving force. FIG. 11 presents a disk with a minimum radius of 24 mm which is approximately 25% more than the roller radius if 18 mm (36 mm diameter).

Figure 13:
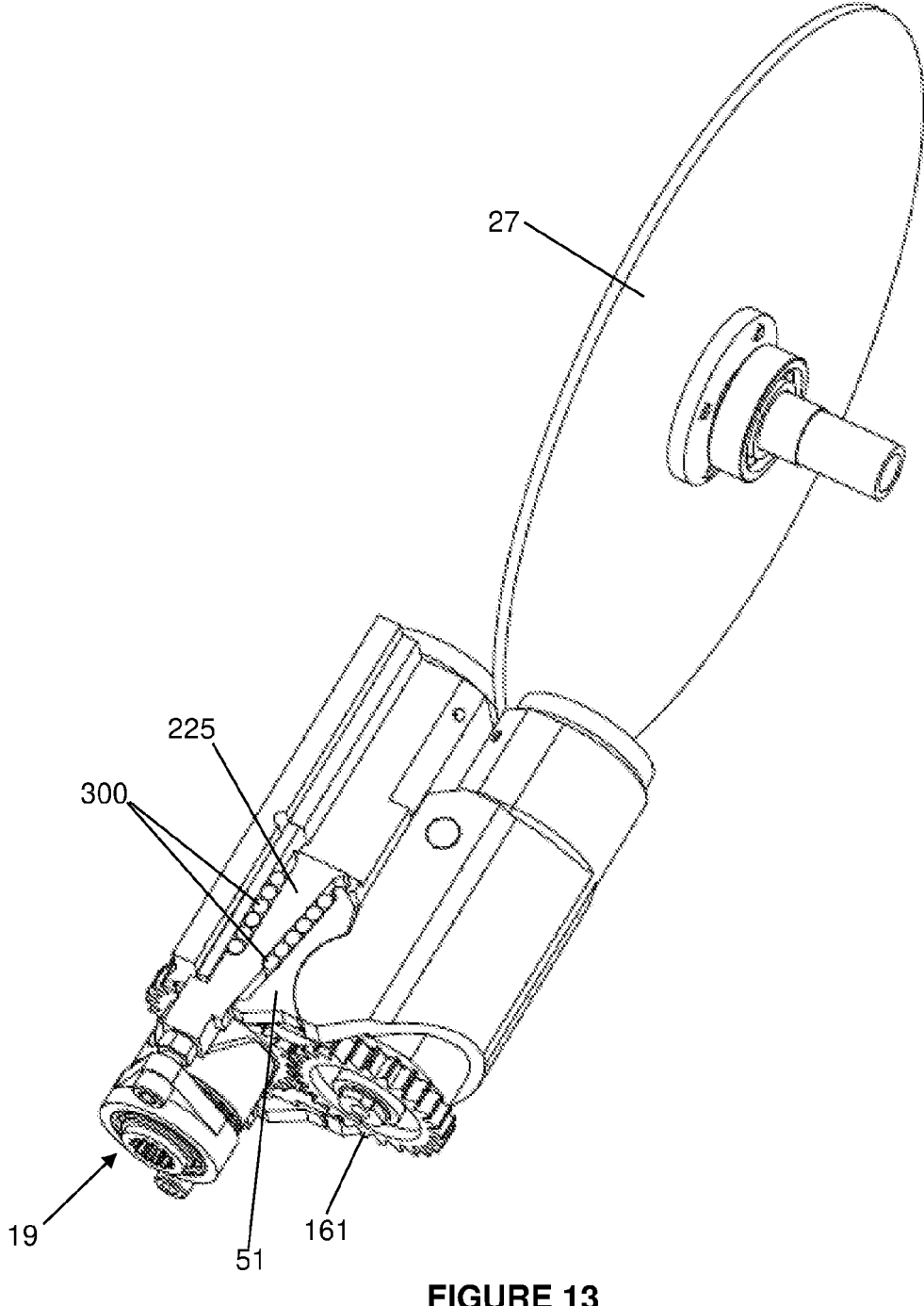
FIG. 13 illustrates an alternative embodiment where friction between the interacting wedges of the loading cam unit and the clamping assembly have been reduced by introducing rollers in the interface.

FIG. 13 illustrates an alternative embodiment where friction between the interacting wedges of the loading cam unit [19] and the clamping assembly [21; 23] have been reduced by introducing rollers [300] in the interface. This will allow for a more efficient system where substantially all the cam axial force is converted to a clamping force, whereas in the absence of these rollers, sliding friction force losses would occur. The clamp unit [21] is modified to include a semi-circle mating with a complimentary cut-out on [89] while wedges [225; 227] and cut-out [89] are adapted at their ends to prevent roller escape.

The invention claimed is:

1. An automatic continuously variable transmission (CVT) drive system for effecting automated gear ratio control, comprising—
    a central friction drive disk;
    two aligned, dual-driven rollers clamped against two opposite sides of the drive disk with their outer rims in friction-drive contact with drive disk, the rollers being axially and synchronously movable across the disk radius to alter the gear ratio;
    a single input drive shaft connected to the rollers for driving the rollers in opposite directions of rotation; and
    a hinged clamping assembly which is mechanically associated with the drive shaft and configured for forcibly clamping the two rollers around the drive disk with a variable clamping force that is proportional to the input torque on drive shaft.

2. The drive system according to claim 1 wherein the rotational axes of the rollers are parallel to each other and perpendicular to the rotational axis of drive disk.

3. The drive system according to claim 2 wherein the first roller is carried at one end of a first roller shaft, which terminates at its opposite end in a first loading cam and concentric bottom gear; while the second roller is carried at one end of a second, parallel roller shaft, which terminates at its opposite end in a top gear; such that the bottom gear of the first roller shaft is meshed with the top gear of the second roller shaft.

4. The drive system according to claim 3 wherein the system includes a torque-responsive loading cam unit, comprising a second loading cam which is axially slidable and driven by the drive shaft, and which engages the complimentarily configured first loading cam of the first roller shaft, with the second loading cam and first loading cam being axially forced apart through an axial force upon introduction of input torque on the drive shaft.

5. The drive system according to claim 4 wherein the loading cam unit further includes a cam plate through which the second axial loading cam extends; and at least one wedge extending from the cam plate parallel to the second loading cam such that rotation of the loading cam rotates the wedge.

6. The drive system according to claim 5 wherein the cam plate is a substantially equilateral quadrilateral plate and the loading cam unit includes two laterally spaced wedges extending parallel to each other from the cam plate.

7. The drive system according to claim 6 wherein the clamping assembly includes wedges which are arranged in sliding engagement with the complimentarily configured wedges of the loading cam unit such that rotation of the second loading cam and wedges converts an axial force into a clamping force that forces the rollers together under pressure of the hinged clamping assembly.

8. The drive system according to claim 7 wherein the top clamp unit includes two clamp wedges, each defining a top surface and bottom surface with an angle Q between the top and bottom surfaces; while the wedges of the loading cam unit each defines a bottom face and a top face with an β angle between the top and bottom faces; such that rotation of the loading cam unit causes the bottom surfaces of top and bottom wedges of the loading cam unit frictionally to slide on the bottom surfaces of clamp wedges of the top clamp unit.

9. The drive system according to claim 8 wherein the system includes a series of rollers in the interface between interacting wedges of the loading cam unit and wedges of clamping assembly to increase conversion of the cam axial force into a clamping force by reducing sliding friction force losses between the wedges.

10. The drive system according to claim 9 wherein the first loading cam includes three identical, cylindrically evenly spaced, axially protruding cam lobes with each cam lobe defining a first cam face and a second cam face representing a helical surface defining a lead with units of m/rev, while the helical surface rotation direction for cam faces and are in opposite directions.

11. The drive system according to claim 10 wherein the clamping assembly comprises a top clamp unit and a bottom clamp unit which are pivotally connected to each other around a swivel pin.

12. The drive system according to claim 11 wherein the bottom clamp unit includes two elongate, parallel bores extending through the clamp unit, and the top clamp unit includes a single bore extending through the clamp unit; the bottom clamp unit and the top clamp unit being pivotally connected to each other such that bore of the bottom clamp unit is concentrically aligned with bore of the top clamp unit, while bore of the bottom clamp unit extends parallel to both bores and.

13. The drive system according to claim 12 wherein the second roller shaft extends through bore of the bottom clamp unit and bore of the top clamp unit; while the first roller shaft extends through bore of the bottom clamp unit.

14. The drive system according to claim 13 wherein rotation of the second loading cam causes the cam wedges to act on the top and bottom clamp units to force the clamp units and rollers shafts apart at one end, while forcing the rollers together under a clamping force at the opposite end of the rollers shafts.

15. The drive system according to claim 14 wherein the drive disk has a minimum disk radius of at least 25% higher than the radius of the rollers.

16. The drive system according to claim 15 wherein the drive disk has a diameter of approximately 248 mm, while the rollers have a diameter of approximately 36 mm.

17. The drive system according to claim 16 wherein the clamping force on the rollers is approximately ×10 times higher than the tangent driving force between the rollers and the drive disk has a coefficient of friction of 0.1.

18. The drive system according to claim 17 wherein the system includes a motor which is connected to the drive shaft for applying rotational force to the drive shaft.

19. The drive system according to claim 18 wherein the system includes a casing unit designed for housing the components of system and for containing traction fluid oil on all rotating components, while allowing for relative ratio movement between the drive disk and rollers.

20. The drive system according to claim 19 wherein CVT friction drive contact between the rollers and drive disk is line contact and is lubricated in the traction fluid, thereby reducing contact stress and increasing power density.

21. The drive system according to claim 20 wherein the system is suitable for use on a bicycle for effecting automated gear ratio control capable of regenerative braking, and wherein the drive shaft extends between and is connected at opposite ends thereof to a bicycle crank unit and the rollers.

* * * * *